Dec. 10, 1957

H. B. BARRETT 2,815,616

HAND TOOLS ADAPTED FOR REMOVING GLAZE FROM
AUTOMOTIVE BRAKE SHOES AND BRAKE DRUMS

Filed Sept. 14, 1955

*INVENTOR.*
HARRY B. BARRETT
BY *alfred w Petchaft*
ATTORNEY

United States Patent Office 2,815,616
Patented Dec. 10, 1957

2,815,616

HAND TOOLS ADAPTED FOR REMOVING GLAZE FROM AUTOMOTIVE BRAKE SHOES AND BRAKE DRUMS

Harry B. Barrett, Clayton, Mo.

Application September 14, 1955, Serial No. 534,245

4 Claims. (Cl. 51—186)

This invention relates in general to certain new and useful improvements in automotive brake repair and maintenance tools and, more particularly, to a hand tool adapted for removing glaze from automotive brake shoes and brake drums.

One of the recurrent difficulties in the care and maintenance in automotive brakes results in the tendency of the brake shoe and brake drum to become coated with a thin film of varnish-like material sometimes referred to as a "glaze." This glaze ordinarily results from the application of the brake when the vehicle is moving at high speed and the braking action tends to generate excessive frictional heat. Under such circumstances, the film of dust, dirt, oil, and other extraneous matter which tends to accumulate on the under portions of the automobile will form the varnish-like film which interferes with proper frictional engagement between the brake shoe and the brake drum and produces a vibratory noise sometimes referred to as squeal or "brake-squeak." When the glaze becomes thick enough, it can materially reduce the efficiency of the brake and must, therefore, be removed. This problem has become particularly acute at the present time due to increased motor vehicle speeds, better highways, all of which impose high speed braking conditions upon the brake shoe and brake drum. In addition, the widespread adoption of various types of automatic transmissions tends to increase the amount of frictional heat and other similar problems upon automotive brakes. Consequently, the brake maintenance mechanic is confronted almost daily with the necessity for removing the glaze from the surfaces of the brakes shoe and brake lining in order to restore the efficient operation of the brake, and this necessity at the present time occurs long before the brake shoe needs relining or the brake drum requires reservicing.

It is, therefore, the primary object of the present invention to provide a simple hand tool which can be quickly and conveniently used for removing the glaze from the surfaces of the brake shoe and brake drum in automotive brakes.

It is another object of the present invention to provide a tool of the type stated which can readily be adapted for all different sizes and types of automotive brakes.

It is a further object of the present invention to provide a hand tool of the type stated which is relatively simple in construction and can be manufactured at comparatively low cost.

It is an additional object of the present invention to provide a hand tool of the type stated which can be utilized quickly and conveniently on brake shoes and drums irrespective of whether or not the brake shoes and brake drums are mounted or dismounted.

With the above and other objects in view, my invention resides in the novel features of form, construction, arrangement, and combination of parts presently described and pointed out in the claims.

In the accompanying drawings (one sheet)—

Figure 2:
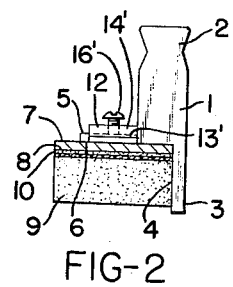
Figure 2 is a transverse sectional view taken along line 2—2 of Figure 1.

Referring now in more detail and by reference characters to the drawings, which illustrate a preferred embodiment of the present invention, A generally designates a hand tool adapted for removing the glaze and other surface imperfections from the braking surfaces of brake shoes and brake drums. The tool consists of a solid one-piece handle member 1, the upper portion of which is machined or otherwise formed to provide a hand-grip 2. The lower portion of the handle member 1 is provided with a downwardly projecting straight flange 3, having an inwardly presented flat face 4. Also formed integrally with the handle member 1 and projecting laterally from the lower portion thereof on the opposite side with respect to the flange 3 are connector ears 5 having flat under faces 6 which are coincident with the under face of the handle member 1 and are disposed at right angles to the side face 4 of the flange 3, all as best seen in Figure 2.

Figure 1:
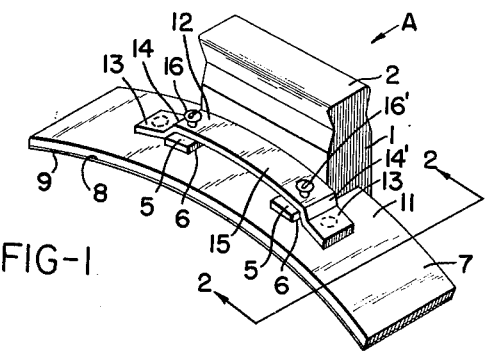
Figure 1 is a perspective view of a hand tool adapted for removing the glaze from automotive brake shoes and brake drums, which hand tool is constructed in accordance with and embodies the present invention.

Provided for co-operation with the handle member 1 is an arcuate shoe-plate 7 sized to conform to the curvature of a particular size of brake shoe. In this connection, it should be noted that there are a number of different standard sizes of automotive brakes, such as the 10", 11", and 12" diameter brakes. Thus, the particular shoe-plate 7 may be sized and shaped so that it will fit one of these standard sizes, such as, for instance, a 10" brake shoe, in which case the under face 8 of the shoe-plate 7 will, in effect, be a segment of a cylindrical surface having a diameter of 10". This arcuate face 8 is provided with a section of abrasive material, such as a piece of emery cloth 9, secured thereto preferably by a film of pressure sensitive adhesive 10, which is applied to the back or non-abrasive face of the emery cloth 9. On its opposite or top face 11, the shoe-plate 7 is provided with a somewhat U-shaped strap 12 integrally including two somewhat arcuate tabs 13, 13', which are spot welded or otherwise rigidly attached to the shoe-plate and are connected by angular legs 14, 14', to an arcuate bight 15, which is spaced upwardly from the top face 11 of the shoe-plate 7 by a distance slightly greater than the thickness of the connector ears 5, so that the latter will slip more or less freely thereunder. The bight 15 is furthermore provided with two set screws 16, 16', which are located for endwise retentive engagement against the top faces of the ears 5, substantially as shown in Figures 1 and 2. Thus, various different sizes of shoe-plates 7 can be quickly and conveniently attached to the handle member 1 to fit the various different sizes of brake shoes encountered in ordinary brake maintenance practice.

Figure 4:
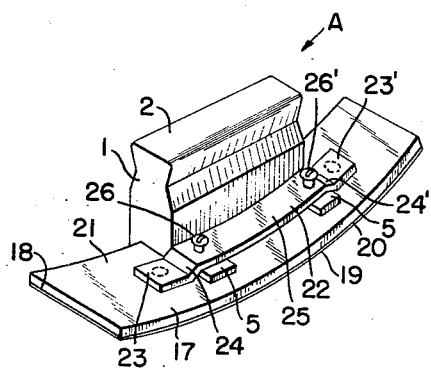
Figure 4 is a perspective view of the hand tool of the present invention as adapted for use with automotive brake drums.

Similarly provided for co-operation with the handle member 1 is a drum-plate 17 having an outer or convex face 18 to which a rectangular strip 19 of emery cloth or other abrasive material is secured by means of a pressure sensitive adhesive 20. On its interior or concave face 21, the drum-plate is provided with a strap 22 having arcuate ears 23, 23', which are welded or otherwise rigidly attached thereto and are joined integrally by means of leg portions 24, 24', to a bight 25, which is adapted to fit over and on top of the ears 5 and which is provided with set screws 26, 26', for tight retentive engagement with the ears 5, substantially in the manner shown in Figure 4.

Figure 3:
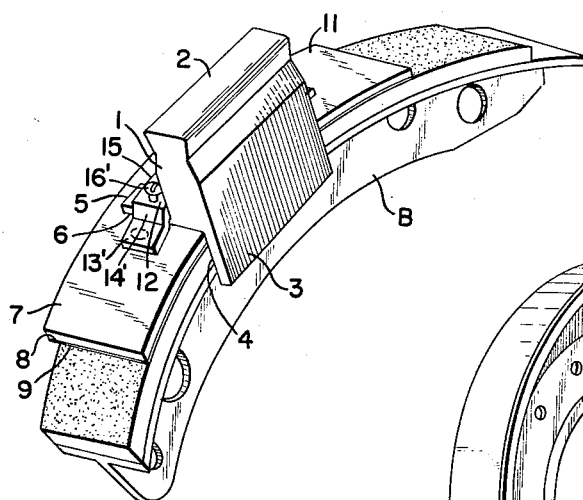
Figure 3 is a perspective view of an automotive brake shoe with the hand tool of the present invention disposed in operative position thereon.
Figure 5:
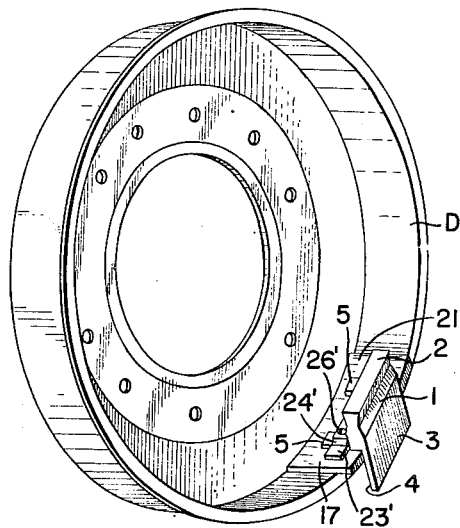
Figure 5 is a perspective view of an automotive brake drum with the hand tool of the present invention disposed in operative position therein.

The handle member 1 may be optionally fitted with the shoe-plate 7 or the drum-plate 17 and applied to either a brake shoe B or a brake drum D, as shown in Figures 3 and 5, respectively. By swinging the hand tool A to-and-fro across the surfaces with a reciprocatory or to-and-fro arcuate movement, it is possible to abrade the surface thereof in a highly efficient precise manner and remove therefrom the glaze and other surface imperfections, rough spots, high spots, and surface irregularities, thereby restoring the surfaces of the brake shoe B and brake drum D to highly efficient operative condition.

It should be understood that changes and modifications in the form, construction, arrangement, and combination of the several parts of the hand tools adapted for removing glaze from automotive brake shoes and brake drums may be made and substituted for those herein shown and described without departing from the nature and principle of my invention.

Having thus described my invention, what I claim and desire to secure by Letters Patent is:

1. A brake maintenance tool comprising an arcuate plate which is a portion of a hollow cylinder, said plate having one of its curved cylindrical faces covered with an abrasive sheet adhesively united therewith and the opposed cylindrical face provided with attachment means rigidly secured thereto, a handle member having a grip portion extending outwardly past one cylindrical surface and a flat guide portion extending beyond the opposite cylindrical surface, said guide portion being adapted to contact a brake member, said handle furthermore having ear means extending outwardly therefrom and interengaging said attachment means to attach said handle to said arcuate plate.

2. A brake maintenance tool comprising an arcuate plate which is a portion of a hollow cylinder, said plate having one of its curved cylindrical faces covered with an abrasive sheet adhesively united therewith and the opposed cylindrical face provided with attachment means rigidly secured thereto, a handle member having a grip portion extending outwardly past one cylindrical surface and a flat guide portion extending beyond the opposite cylindrical surface, said guide portion being adapted to contact a brake member, said handle furthermore having ear means extending outwardly therefrom and interengaging said attachment means to attach said handle to said arcuate plate, and means operatively associated with said ear means and attachment means for supporting said handle in any one of several positions of adjustment toward and away from said plate.

3. A brake maintenance tool comprising a convex arcuate plate which is a portion of a hollow cylinder, said plate having its inner curved cylindrical face covered with an abrasive sheet adhesively united therewith and the outer cylindrical face provided with attachment means rigidly secured thereto, a handle member having a grip portion extending outwardly past the outer cylindrical surface and a flat guide portion extending beyond the inner cylindrical surface, said guide portion being adapted to contact a brake shoe, said handle furthermore having ear means extending outwardly therefrom and interengaging said attachment means to attach said handle to said arcuate plate.

4. A brake maintenance tool comprising a concave plate which is a portion of a hollow cylinder, said plate having its outer curved cylindrical face covered with an abrasive sheet adhesively united therewith and the inner cylindrical face provided with attachment means rigidly secured thereto, a handle member having a grip portion extending inwardly past the inner cylindrical surface and a flat guide portion extending beyond the outer cylindrical surface, said guide portion being adapted to contact a brake drum, said handle furthermore having ear means extending outwardly therefrom and interengaging said attachment means to attach said handle to said arcuate plate.

References Cited in the file of this patent

UNITED STATES PATENTS

| | | |
|---|---|---|
| 271,222 | Coffin | Jan. 30, 1883 |
| 1,759,739 | Ferris | May 20, 1930 |
| 2,059,583 | Jackson et al. | Nov. 3, 1936 |
| 2,083,685 | Burkhalter | June 15, 1937 |
| 2,446,026 | Ruby | July 27, 1948 |
| 2,541,330 | Bourdunis | Feb. 13, 1951 |
| 2,546,245 | Weigel | Mar. 27, 1951 |

FOREIGN PATENTS

| | | |
|---|---|---|
| 523,147 | Germany | June 1, 1929 |